US008213720B2

(12) United States Patent
Hu

(10) Patent No.: US 8,213,720 B2
(45) Date of Patent: Jul. 3, 2012

(54) SYSTEM AND METHOD FOR DETERMINING CHIN POSITION IN A DIGITAL IMAGE

(75) Inventor: Xuebin Hu, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 814 days.

(21) Appl. No.: 12/240,066

(22) Filed: Sep. 29, 2008

(65) Prior Publication Data
US 2009/0087089 A1 Apr. 2, 2009

(30) Foreign Application Priority Data

Sep. 28, 2007 (JP) ................... 2007-253237

(51) Int. Cl.
G06K 9/46 (2006.01)
G06K 9/66 (2006.01)
G06K 9/00 (2006.01)

(52) U.S. Cl. ............ 382/190; 382/118; 382/165
(58) Field of Classification Search ............ None
See application file for complete search history.

(56) References Cited

U.S. PATENT DOCUMENTS

| 7,324,669 | B2 | 1/2008 | Nakanishi et al. | |
|---|---|---|---|---|
| 7,764,828 | B2* | 7/2010 | Sasaki et al. | 382/154 |
| 2005/0013599 | A1* | 1/2005 | Nakanishi et al. | 396/2 |
| 2006/0126964 | A1* | 6/2006 | Chen | 382/286 |
| 2006/0133672 | A1 | 6/2006 | Li | |

FOREIGN PATENT DOCUMENTS

| JP | 2000-036032 A | 2/2000 |
|---|---|---|
| JP | 2004-334836 A | 11/2004 |
| JP | 2005-202841 A | 7/2005 |
| JP | 2006-133824 A | 5/2006 |
| JP | 2007-011970 A | 1/2007 |
| JP | 2007-072628 A | 3/2007 |

OTHER PUBLICATIONS

Karin Sobottka, Ioannis Pitas, "A novel method for automatic face segmentation, facial feature extraction and tracking", Signal Processing: Image Communication 12 (1998) 263-281.*
Notification of Grounds for Rejection, dated Jul. 26, 2011, issued in corresponding JP Application No. 2007-253237, 4 pages in English and Japanese.

* cited by examiner

Primary Examiner — Li Liu
(74) Attorney, Agent, or Firm — Sughrue Mion, PLLC

(57) ABSTRACT

Automatic detection of chin positions is enabled from within digital images regardless of the facing directions of the faces. Faces having skin color are detected from input color images. Reference lines from center positions between eyes and center positions of mouths, which are included in faces are calculated, based on the faces detected by the face detecting section. Data that indicates statistical positional relationships among center positions between eyes, center positions of mouths, and chins therein are obtained. Probabilities that the reference lines calculated by the reference line calculating section include the positions of chins, based on the data that indicates the statistical positional relationships and the reference lines are calculated. Probabilities of skin colored pixels being present on the reference line are calculated. Rates of brightness variations along the reference line are calculated. Positions of chins are calculated based on combinations of the above the results of calculation.

4 Claims, 6 Drawing Sheets

FIG.5
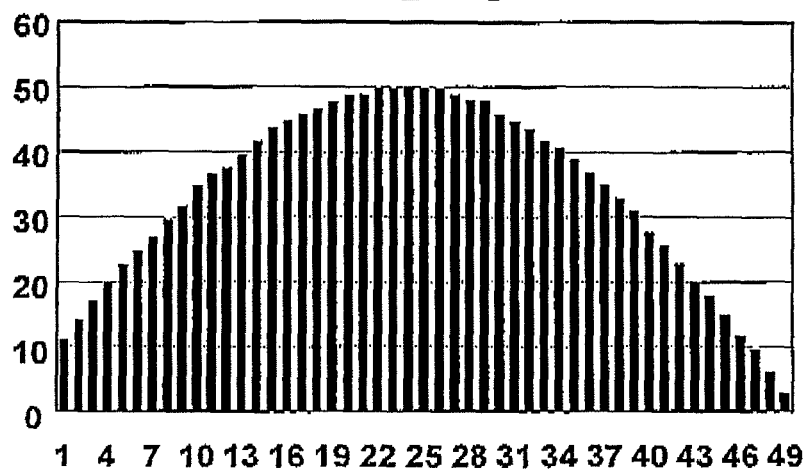
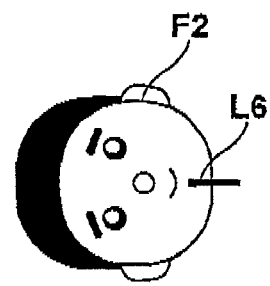
FIG.6
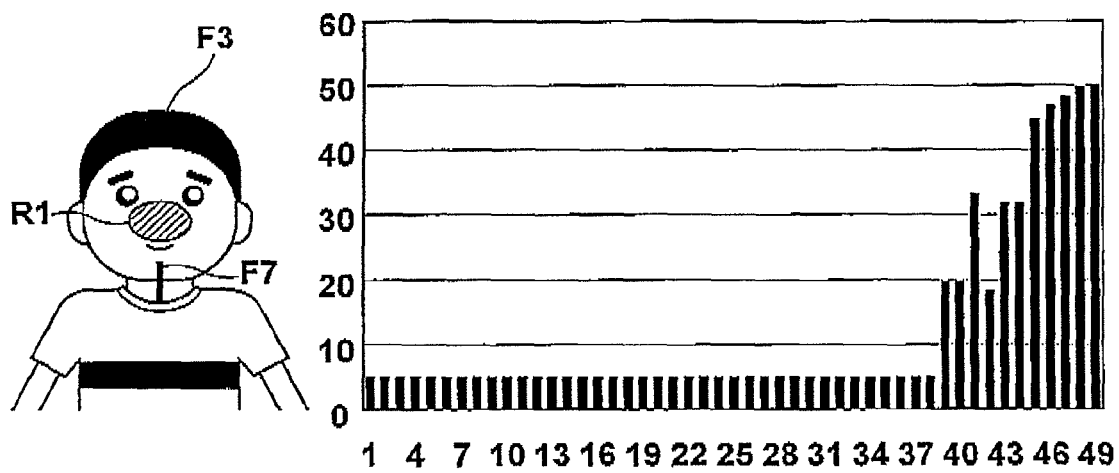

SYSTEM AND METHOD FOR DETERMINING CHIN POSITION IN A DIGITAL IMAGE

BACKGROUND OF THE INVENTION

1. Field of the Invention

The present invention relates to a chin position calculating process. Particularly, the present invention relates to a chin position calculating apparatus suited for automatically detecting the positions of the chins of humans in digital images, an image processing apparatus that employs the chin position calculating apparatus, a chin position calculating method, and a recording medium having a chin position calculating program recorded therein.

2. Description of the Related Art

Image processes, such as color tone correction, brightness correction, and image synthesis, have become easy to administer on digital images obtained by photography using digital still cameras, when photographing portraits of people. Therefore, various image processes are administered on photographed digital images such that they have favorable finishes, then the digital images are printed out.

There are empirically determined preferred compositions for portraits. When people are the subjects of photography, photography is performed with the faces of the people as reference points for compositional balance such that such compositions are achieved. However, photography having ideal compositions cannot always be performed. Therefore, faces are automatically detected from within digital images which have been photographed with compositions that are not ideal, the images are trimmed with the detected faces as reference points for compositional balance, then the trimmed images are printed out, such that the images achieve ideal compositions. However, there is a problem that optimal trimming processes cannot be administered unless the tops of heads and chins are accurately detected.

For this reason, methods for accurately detecting the positions of chins band methods for trimming images using data regarding detected chin positions have been proposed. For example, Japanese Unexamined Patent Publication No. 2005-202841 discloses a method, in which: outlines of faces included in images are extracted; and quadratic curves that are convex toward the downward direction and which are similar to the outlines of chins are obtained; to calculate the positions of chins. Japanese Unexamined Patent Publication No. 2000-036032 discloses a method, in which: differences between background images and images of subjects are obtained; mask images of humans are generated from the images of the subjects; and trimming processes are administered by searching for the positions of the tops of heads and chins from within the mask images, such that the faces of the subject are at predetermined positions. Japanese Unexamined Patent Publication No. 2007-072628 discloses a method in which: edge processes are administered on images that represent faces; and each pixel value obtained by the edge processes is projected in a predetermined direction to generate histograms; to estimate the positions of chins. U.S. Pat. No. 7,324,669 discloses a method for trimming images, in which: faces included in images are extracted; and the positions of chins are calculated, based on the presumption that the ratio of distances between chins and mouths and distances between eyes and mouths are constant.

However, there are various problems with the aforementioned image processing methods for detecting the chin positions, as will be described below. In the method disclosed by Japanese Unexamined Patent Publication No. 2005-202841, there are cases in which the shapes of chins differ if faces are not facing front, and also due to differences among individuals. Therefore, the shapes of chins do not necessarily approximate a downwardly convex quadratic curve, and erroneous detection may occur. In the method disclosed by Japanese Unexamined Patent Publication No. 2000-036032, there are cases in which borderlines between the outlines of faces and necks cannot be continuously recognized, due to intensities of illuminating light sources and skin tone. In these cases, stable performance cannot be obtained in the extraction process using mask images. In the method disclosed by U.S. Pat. No. 7,324,669, there are cases in which erroneous detection may occur, due to some people not having the same ratio of distances between chins and mouths and distances between eyes and mouths as the accepted standard.

SUMMARY OF THE INVENTION

The present invention has been developed in view of the foregoing circumstances. It is an object of the present invention to provide a chin position calculating apparatus, an image processing apparatus that employs the chin position calculating apparatus, a chin position calculating method and a chin position calculating program which has improved detection performance with regard to positions of chins.

A chin position calculating apparatus of the present invention comprises: a face detecting section that detects faces having skin color, from input color images; a reference line calculating section that calculates reference lines from center positions between eyes and center positions of mouths, which are included in faces, based on the faces detected by the face detecting section; a database having data that indicates statistical positional relationships among center positions between eyes, center positions of mouths, and chins therein; a chin position estimating section that calculates the probabilities that the reference lines calculated by the reference line calculating section include the positions of chins, based on the data that indicates the statistical positional relationships and the reference lines; a skin color probability calculating section that calculates the probabilities of skin colored pixels being present on the reference line; a brightness variation calculating section that calculates the rates of brightness variations along the reference line; and a chin position calculating section that calculates the positions of chins based on the results of calculation obtained by the chin position estimating section, the skin color probability calculating section, and the brightness variation calculating section.

The "database" may have data that represents statistical positional relationships constituted by ratios of distances between the center position between eyes and center positions of mouths, and distances between the centers of mouths and the positions of chins, from among a plurality of color images that include faces.

An image processing apparatus of the present invention comprises: a chin position calculating apparatus of the present invention; a top of head position calculating section that calculates the positions of the tops of heads, based on the faces detected by the face detecting section; and a trimming section that determines ranges to be trimmed within the input color images, based on the positions of tops of heads calculated by the top of head position calculating apparatus and the positions of chins calculated by the chin position calculating section, and trims the color images.

A chin position calculating method of the present invention comprises the steps of: detecting faces having skin color, from input color images; calculating reference lines from center positions between eyes and center positions of mouths, which are included in faces, based on the faces detected by the face detecting section; obtaining data that indicates statistical positional relationships among center positions between eyes, center positions of mouths, and chins therein; calculating the probabilities that the reference lines calculated by the reference line calculating section include the positions of chins, based on the data that indicates the statistical positional relationships and the reference lines; calculating the probabilities of skin colored pixels being present on the reference line; calculating the rates of brightness variations along the reference line; and calculating the positions of chins based on combinations of the above results of calculation.

A chin position calculating program of the present invention causes a computer to execute the functions of: detecting faces having skin color, from input color images; calculating reference lines from center positions between eyes and center positions of mouths, which are included in faces, based on the faces detected by the face detecting section; obtaining data that indicates statistical positional relationships among center positions between eyes, center positions of mouths, and chins therein; calculating the probabilities that the reference lines calculated by the reference line calculating section include the positions of chins, based on the data that indicates the statistical positional relationships and the reference lines; calculating the probabilities of skin colored pixels being present on the reference line; calculating the rates of brightness variations along the reference line; and calculating the positions of chins based on combinations of the above results of calculation.

According to the chin position calculating apparatus, the image processing apparatus that employs the chin position calculating apparatus, the chin position calculating method, and the chin position calculating program of the present invention, data indicating statistical positional relationships among the center positions between eyes, the center positions of mouths, and the positions of chins are obtained. The data that represents the positional relationships and the calculated reference lines are used to calculate the probabilities that the reference lines calculated by the reference line calculating section include the positions of chins. Then, the probabilities of skin colored pixels being present on the reference line are calculated. Thereafter, the rates of brightness variations along the reference line are calculated. Finally, the positions of chins are calculated based on combinations of the above results of calculation. Therefore, accurate detection of chin positions is enabled.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object, and executable code, and can be in any language, including higher level languages, assembly language, and machine language.

BRIEF DESCRIPTION OF THE DRAWINGS

FIG. 5 illustrates a graph of rates of brightness variation among pixels along a reference line.

FIG. 6 illustrates a graph of probabilities that skin colored pixels are present.

BEST MODE FOR CARRYING OUT THE INVENTION

Figure 1:
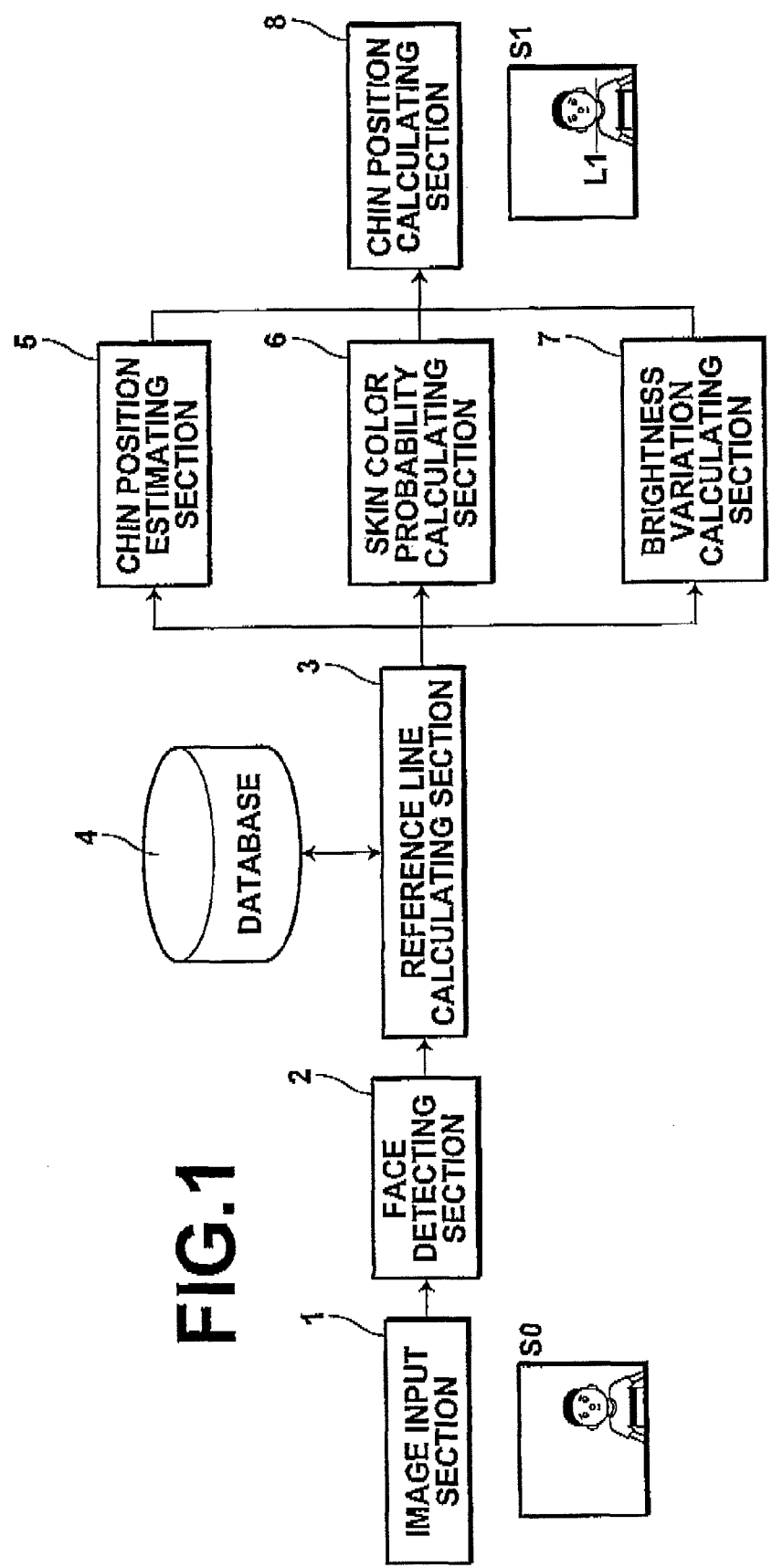
FIG. 1 is a schematic block diagram that illustrates the construction of a chin position calculating apparatus according to a first embodiment of the present invention.

Hereinafter, a first embodiment of the present invention will be described. FIG. 1 is a schematic block diagram that illustrates the construction of a chin position calculating apparatus according to the first embodiment of the present invention. As illustrated in FIG. 1, the chin position calculating apparatus of the first embodiment is equipped with: an image input section 1 that receives input of image data sets S0 that represent images including faces; a face detecting section 2 that detects face regions from within images S0 represented by the image data sets S0 (hereinafter, image data sets and images will be denoted by the same reference characters); a reference line calculating section 3 that calculates reference lines, based on the center positions between eyes and the center positions of mouths included in the detected face regions; a database 4 which has data that indicates statistical positional relationships among center positions between eyes, center positions of mouths, and positions of chins therein; a chin position estimating section 5 that calculates the probabilities that the reference lines calculated by the reference line calculating section 3 include the positions of chins, based on the data that indicates the statistical positional relationships and the reference lines; a skin color probability calculating section 6 that calculates the probabilities of skin colored pixels being present on the reference line; a brightness variation calculating section 7 that calculates the rates of brightness variations along the reference line; and a chin position calculating section 8 that calculates the positions of chins within the images S0 based on the results of calculation obtained by the chin position estimating section 5, the skin color probability calculating section, and the brightness variation calculating section.

Image S1 of FIG. 1 illustrates a horizontal line L1 which is drawn across a chin position calculated by the chin position calculating section 8. In the case that a monitor or the like is connected to the chin position calculating apparatus, it is possible to display the horizontal line L1.

The image input section 1 is a media drive that reads out the images S0 from media having the images S0 recorded therein, interfaces that receive input of the images S0, which are transmitted via networks, or the like. Note that the images S0 may be images which have been obtained by imaging devices such as digital cameras, or images which have been obtained by photoelectric readout of images recorded on film or prints.

The face detecting section 2 administers a process that automatically detects face regions from within the images S0, based on one of: position, size, facing direction, inclination, chroma, and hue, which are evaluation values that represent the likelihood that regions within images are face regions.

The method disclosed in U.S. Patent Application Publication No. 20060133672 (hereinafter, referred to as Reference Document 1) may be employed, for example. In this method, known techniques such as movement vectors and feature detection, or a machine learning technique based on Adaboost is utilized to track faces. Adaboost is a technique in which learning data is continuously renewed at each re-sampling operation, to create machines, then the machines are weighted and combined to form an integrated learning machine. For example, an average frame model may be fitted into an actual image of a face, and the positions of landmarks (eyes and mouth, for example) within the average frame model may be moved to match the positions of corresponding landmarks which have been detected in the image of the face, thereby deforming the average frame model to construct a frame model of the face. Classifiers and classifying conditions for each landmark are obtained by learning brightness profiles of points within a plurality of sample images, which are known to be of predetermined landmarks, and brightness profiles of points within a plurality of sample images, which are known not to be of predetermined landmarks. The classifiers and classifying conditions are employed to detect points within the image of the face that represent the landmarks. Alternatively, the method disclosed in Japanese Unexamined Patent Publication No. 2004-334836 (hereinafter, referred to as Reference Document 2) may be employed. This method utilizes a characteristic portion extraction technique, in which: image data sets of a predetermined size are cut out from a target image data set; and each cut out image data set is compared against image data sets representing characteristic portions; to detect whether images of characteristic portions are present within the target image. Note that faces of animals may also be detected as specific subjects in addition to human faces, as disclosed in Japanese Unexamined Patent Publication No. 2007-011970 (hereinafter, referred to as Reference Document 3).

The reference line calculating section 3 calculates reference lines from the center positions between the eyes and the center positions of the mouths which are included in the face regions detected by the face detecting section 2. Specifically, coordinates for the positions of the inner corners of the left and right eyes, the positions of the outer corners of the left and right eyes, the position of the mouths, and the positions of the tops of heads, are obtained as features. The features are obtained by using classifiers for each facial component, obtained by machine learning of a great number of sample images of the facial components, or by a template matching technique that employs templates for each facial component. The coordinates of the positions of the eyes are calculated by calculating the positions thereof from the positions of the inner and outer corners of the eyes. Specifically, the positions of the left and right eyes are calculated as the midpoints between the inner and outer corners of the left and right eyes.

The database 4 has data that indicates statistical positional relationships among center positions between eyes, center positions of mouths, and the positions of chins therein. For example, the database may have previously obtained data indicating statistical positional relationships constituted by ratios of distances between the center position between eyes and center positions of mouths, and distances between the centers of mouths and the positions of the chins, obtained from approximately 950 images.

The chin position estimating section 5 calculates the probabilities for each pixel on the reference lines being the position of the chin, based on the data indicating the positional relationships of the database 4 and the reference lines calculated by the reference line calculating section 3.

The skin color probability calculating section 6 sets predetermined face color hue areas (the areas between the eyes and noses, for example) within the face regions detected by the face detecting section 2. The skin color probability calculating section 6 then calculates the distances of each pixel along the reference lines from the face color hue areas. The probabilities of skin colored pixels being present are calculated, based on the distances from the face color hue areas.

The brightness variation calculating section 7 calculates the rates of brightness variation along the reference lines.

The chin position calculating section 8 calculates the positions of chins, based on combinations of the probabilities calculated by the chin position estimating section 5, the probabilities of skin colored pixels existing along the reference lines calculated by the skin color probability calculating section 6, and the rates of brightness variation calculated by the brightness variation calculating section 7. Specifically, the rates of brightness variation are multiplied by the probabilities, then divided by the probabilities of skin colored pixels existing, to generate predetermined data sets. The position that results in the maximum peak value for the predetermined data sets is calculated as the position of the chin.

Figure 2:
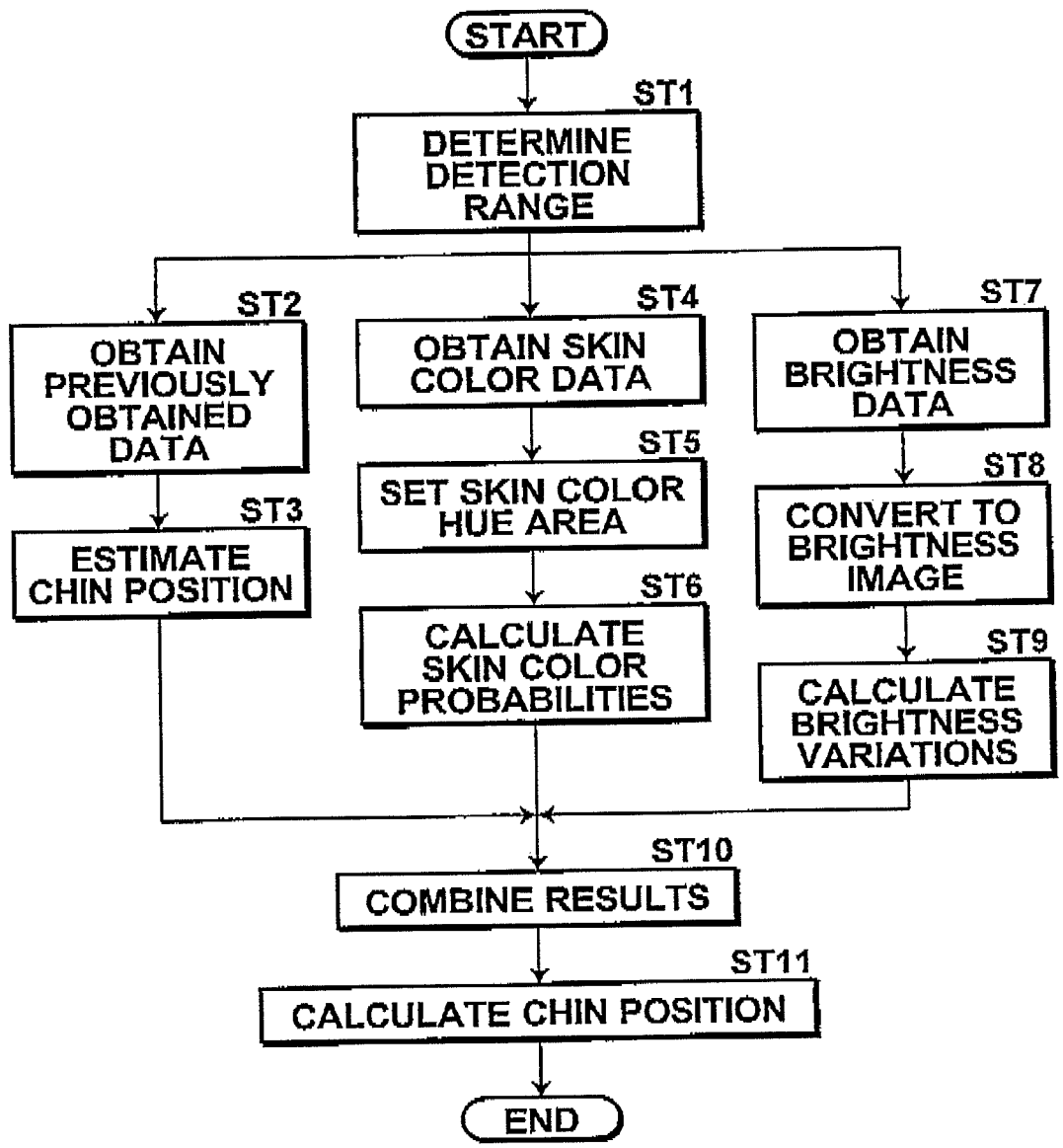
FIG. 2 is a flow chart that illustrates the processes performed by the trimming apparatus of the first embodiment.
Figure 3:
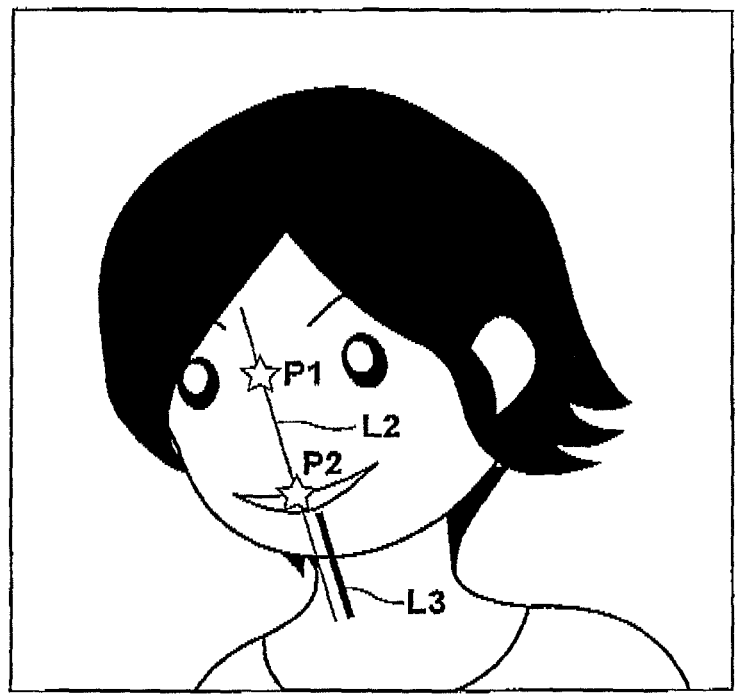
FIG. 3 illustrates an image of a face with a reference lines drawn therein.

Next, the processes performed by the chin position calculating apparatus of the first embodiment will be described. FIG. 2 is a flow chart that illustrates the processes performed by the chin position calculating apparatus of the first embodiment. The processes are initiated when an image data set S0 is read out by the image input section 1. The face detecting section 2 detects a face region from within the image S0, and sets the detected face region as a detection range (step ST1). Further, the reference line calculating section 3 calculates a reference line, based on the center position between the eyes and the center position of the mouth, which are included in the face region detected by the face detecting section 2. Specifically, a line L2 that connects the center position P1 between the eyes and the center position P2 of the mouth is designated as the reference line, as illustrated in FIG. 3. Then, the chin position estimating section 5 obtains the previously obtained data indicating statistical positional relationships constituted by ratios of distances between the center position between eyes and center positions of mouths, and distances between the centers of mouths and the positions of the chins from the database 4 (step ST2). Thereafter, the chin position estimating section 5 calculates probabilities that each pixel along the reference line L2 calculated by the reference line calculating section 3 includes the position of a chin, based on the data that indicates the statistical positional relationships obtained from the database 4 and the reference line (step ST3). A chin detecting line L3 is calculated as a line having a high probability of including the chin.

Figure 4:
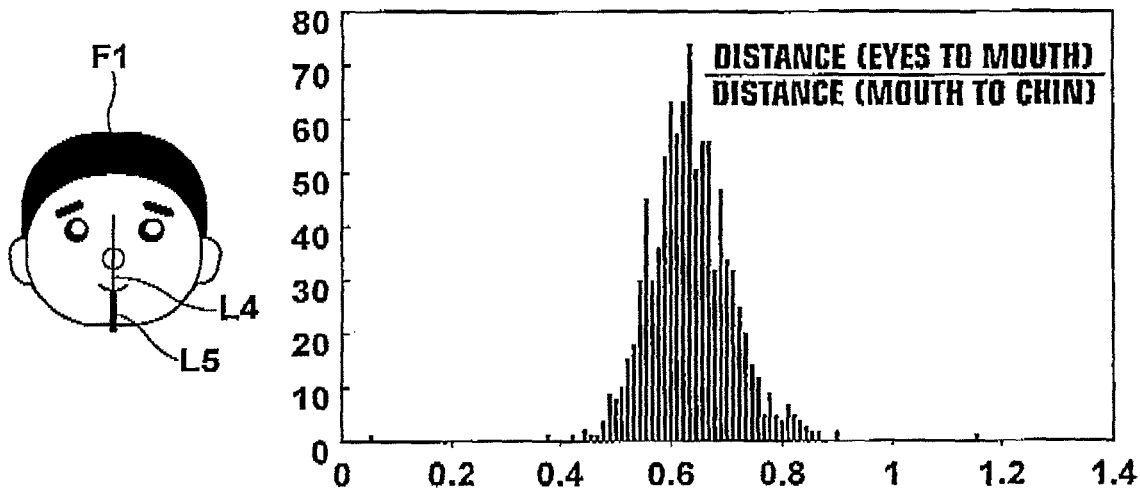
FIG. 4 illustrates an example of a probability graph.

Specifically, a probability graph is generated. The probability graph is illustrated in FIG. 4, taking a detected face region F1 as an example. The graph indicates distances L4/L5, wherein L5 is the distance between the position of the chin to the center position of the mouth, and L4 is the distance from the center position between the eyes and the center of the mouth. L5 is set to be a third of L4, for example.

Meanwhile, the skin color probability calculating section 6 obtains data regarding the hue of the face region detected by the face detecting section 2 (step ST4). The skin color probability calculating section 6 estimates a region having the most pixels having the hue of skin color, based on the obtained data regarding the hue. For example, large numbers of pixels having the hue of skin color are present in areas between the eyes and noses, and therefore, this area is set as the face color hue area (step ST5). Further, the skin color probability calculating section 6 calculates the distance of each pixel along the reference line calculated by the reference line calculating section 3 from the skin color hue area. The probabilities of skin colored pixels being present on the reference line are calculated based on the distances from the face color hue area. At this time, the probability that a pixel is in the position of skin is low in cases that the distance from the face color hue area is great. Therefore, it is judged that the probability that this pixel represents the chin is low, and the probability is calculated to be low (step ST6).

Specifically, FIG. 6 illustrates a graph of probabilities that skin colored pixels are present, taking a detected face region F3 as an example. The graph illustrates the probabilities that each pixel on a reference line F7 is a skin colored pixel, based on the distances thereof from a skin color hue area R1.

Meanwhile, the brightness variation calculating section 7 obtains the image S0 read out from the image input section 1, in order to obtain data regarding brightness (brightness values, for example) thereof (step ST7). Thereafter, the brightness variation calculating section 7 converts each of the RGB values within the image S0 to a brightness value (step ST8). Further, the brightness variation calculating section 7 calculates the rates of brightness variation among the brightness values corresponding to the pixels along the reference line calculated by the reference line calculating section 3 (step ST9).

Specifically, FIG. 5 illustrates a graph of rates of brightness variation among pixels along a reference line, taking a detected face region F2 as an example. The graph illustrates the rate of brightness variation for each pixel along a reference line L6.

Figure 7:
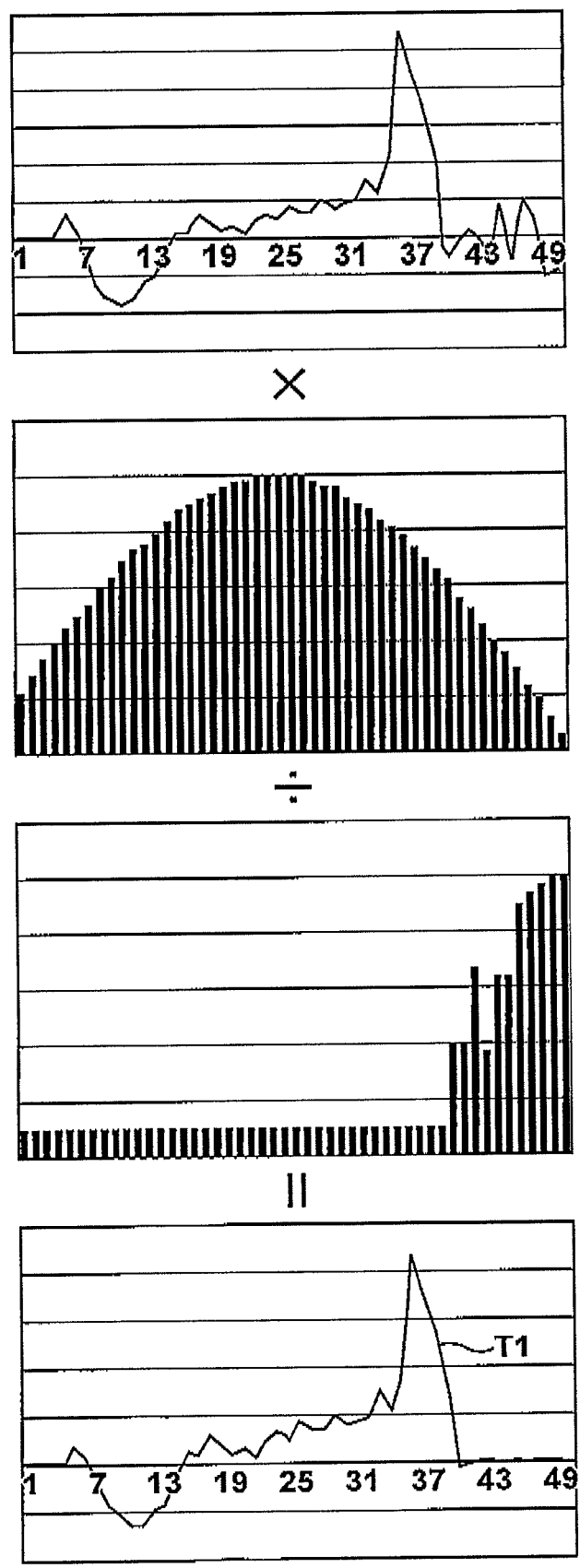
FIG. 7 illustrates the manner in which a chin position is calculated.

As illustrated in FIG. 7, the chin position calculating section 8 multiplies the rates of brightness variation by the probabilities calculated by the chin position estimating section 5, then divides the product by the probabilities that skin colored pixels existing, to generate predetermined data sets T1 (step ST10). The position that results in the maximum peak value for the predetermined data sets T1 is calculated as the position of the chin (step ST11).

Next, a second embodiment of the present invention will be described.

Figure 8:
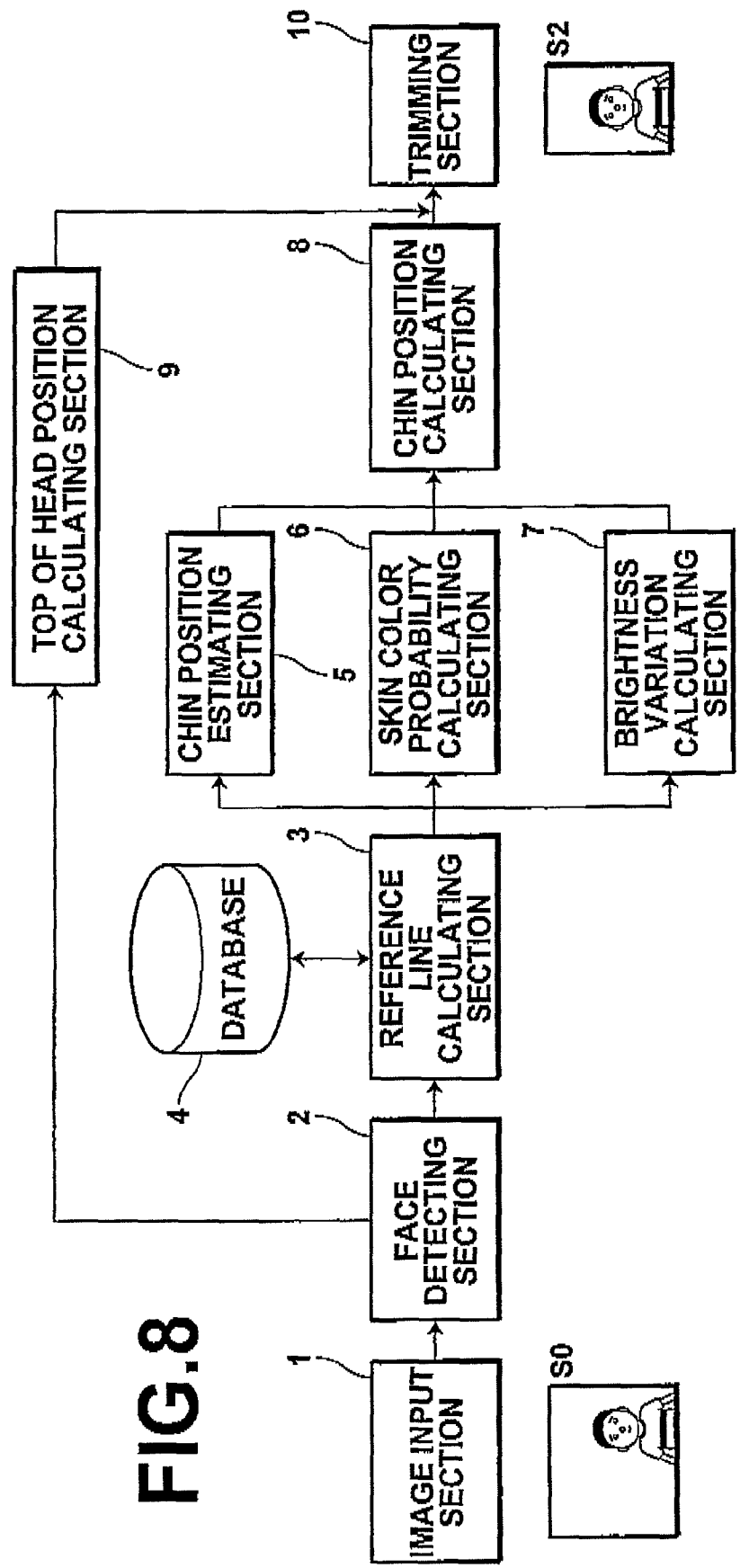
FIG. 8 is a schematic block diagram of an image processing apparatus according to a second embodiment of the present invention.

FIG. 8 is a schematic block diagram of an image processing apparatus according to the third embodiment of the present invention, which includes a trimming section 10.

Here, only components which are different from the chin position calculating apparatuses of the first embodiment will be described. Components which are the same as those of the first embodiment will be denoted with the same reference numerals, and detailed descriptions thereof will be omitted.

A top of head position calculating section 9 calculates the positions of the tops of heads, based on face regions detected by the face detecting section 2. Specifically, detection ranges, within which the tops of heads are searched for, are set based on the detected face regions. Then, hair regions are detected, by extracting high frequency components from within the detection ranges. The positions of the tops of heads are calculated, based on the detected hair regions. When the hair regions are detected, the portions of images within the detection ranges are converted to brightness images, the high frequency components are extracted by a filtering process, and an emphasizing process is administered on the extracted high frequency components to set the hair regions. The uppermost parts of the set hair regions are calculated as the positions of the tops of heads. Further, the head position calculating section 9 may judge whether a hair region has been detected, and calculate rates of brightness variation by calculating horizontal brightness gradients within the portions of images within the detection ranges in cases that it is judged that a hair region has not been detected. The database 4 may have data that indicates statistical positional relationships among the center positions between the eyes, the center position of mouths, and the positions of the tops of heads therein. In this case, probabilities for the position of tops of heads may be calculated, based on the data that indicates the statistical positional relationships and center positions between eyes and center positions of mouths within the detected face regions. The positions of the tops of heads may be calculated, based on combinations of the above results of calculation.

The trimming section 10 determines a range to be trimmed, based on the position of the chin calculated by the chin position calculating section 8 and the position of the top of the head calculated by the top of head position calculating section 9, then trims the image S0.

Image S2 of FIG. 8 is the result of determination of a range to be trimmed and a trimming operation, which are administered with respect to the image S0. In the case that a monitor or the like is connected to the image processing apparatus, it is possible to display the results of trimming for confirmation by users.

It is possible to install a program that causes a computer to execute the functions of the top of head calculating apparatus and the image processing apparatus of the present invention in a personal computer. In this case, it is possible for the personal computer to perform calculation of the chin positions and trimming as described in the embodiments above.

In addition, it is possible to incorporate the top of head position calculating apparatus and the image processing apparatus of the present invention into an imaging device. In this case, the calculation results of top of head positions and results of trimming may be confirmed by a user, using a monitor or the like provided on the imaging device.

What is claimed is:
1. An image processing apparatus, comprising:
a chin position calculating apparatus comprising:
a face detecting section that detects faces having skin color, from input color images;
a reference line calculating section that calculates reference lines from center positions between eyes and center positions of mouths, which are included in faces, based on the faces detected by the face detecting section;
a database having data that indicates statistical positional relationships among center positions between eyes, center positions of mouths, and chins therein;
a chin position estimating section that calculates the probabilities that the reference lines calculated by the reference line calculating section include the positions of chins, based on the data that indicates the statistical positional relationships and the reference lines;
a skin color probability calculating section including a processor that calculates the probabilities of skin colored pixels being present on the reference line;
a brightness variation calculating section that calculates the rates of brightness variations along the reference line; and
a chin position calculating section that calculates the positions of chins based on the results of calculation obtained by the chin position estimating section, the skin color probability calculating section, and the brightness variation calculating section;
said image processing apparatus further comprising:
a top of head calculating section that calculates the positions of the tops of heads, based on the faces detected by the face detecting section; and
a trimming section that determines ranges to be trimmed within the input color images, based on the positions of chins calculated by the chin position calculating section and the positions of the tops of heads calculated by the top of head calculating section, and trims the color images.

2. The image processing apparatus as defined in claim 1, wherein in the chin position calculating apparatus:

the database has data that represents statistical positional relationships constituted by ratios of distances between the center position between eyes and center positions of mouths, and distances between the centers of mouths and the positions of chins, from among a plurality of color images that include faces.

3. A chin position calculating method, comprising the steps of:

detecting faces having skin color, from input color images;

calculating reference lines from center positions between eyes and center positions of mouths, which are included in faces, based on the faces detected by the face detecting section;

obtaining data that indicates statistical positional relationships among center positions between eyes, center positions of mouths, and chins therein;

calculating the probabilities that the reference lines calculated by the reference line calculating section include the positions of chins, based on the data that indicates the statistical positional relationships and the reference lines;

calculating the probabilities of skin colored pixels being present on the reference line;

calculating the rates of brightness variations along the reference line; and calculating the positions of chins based on combinations of the above results of calculation.

4. A non-transitory recording medium having a program recorded therein that causes a computer to execute the functions of:

detecting faces having skin color, from input color images;

calculating reference lines from center positions between eyes and center positions of mouths, which are included in faces, based on the faces detected by the face detecting section;

obtaining data that indicates statistical positional relationships among center positions between eyes, center positions of mouths, and chins therein;

calculating the probabilities that the reference lines calculated by the reference line calculating section include the positions of chins, based on the data that indicates the statistical positional relationships and the reference lines;

calculating the probabilities of skin colored pixels being present on the reference line;

calculating the rates of brightness variations along the reference line; and calculating the positions of chins based on combinations of the above results of calculation.

* * * * *